United States Patent Office 3,447,661
Patented June 3, 1969

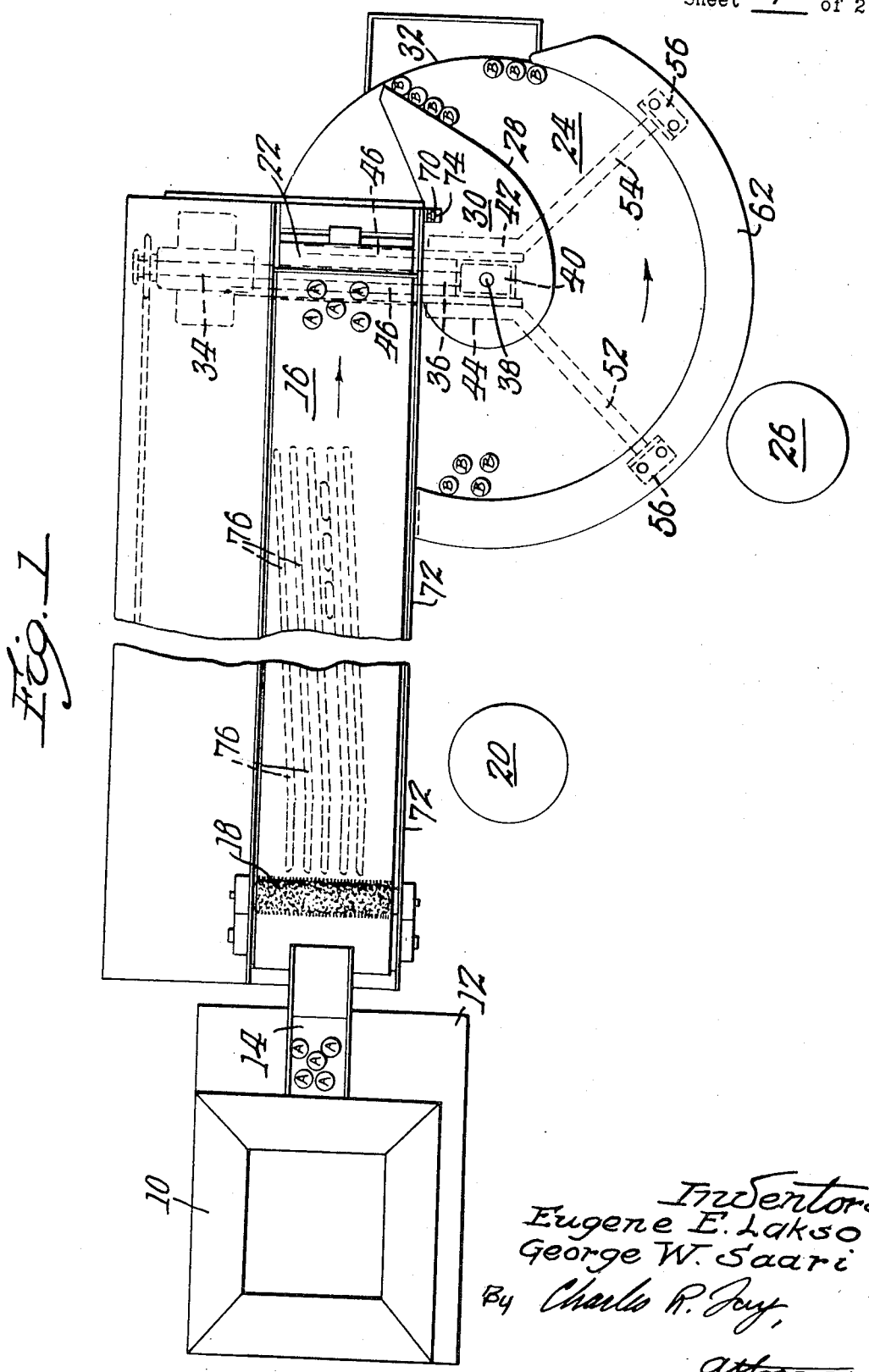

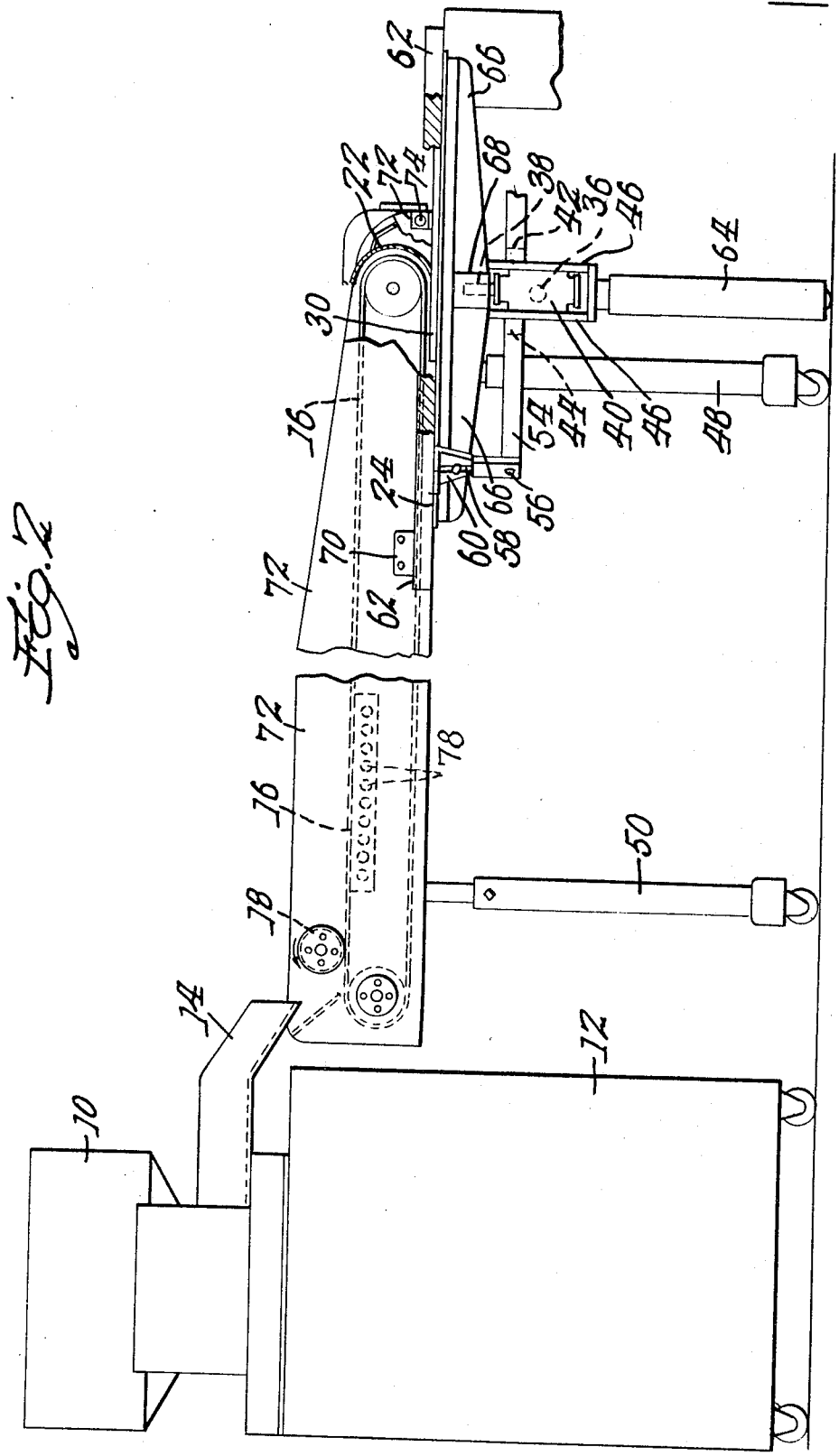

3,447,661
INSPECTION TABLE FOR TABLETS AND CAPSULES
Eugene E. Lakso, Ashburnham, and George W. Saari, Westminster, Mass., assignors to The Lakso Company Incorporated, Fitchburg, Mass., a corporation of Massachusetts
Filed July 14, 1967, Ser. No. 653,544
Int. Cl. B65j 47/24
U.S. Cl. 198—33                                   4 Claims

ABSTRACT OF THE DISCLOSURE

An inspection table which comprises a source of articles to be inspected, an endless belt upon which said articles are arranged in a single layer for inspection of one side thereof, means at an end of said endless belt for inverting said articles onto a second inspection apparatus so that the opposite sides thereof may be seen, the second inspection device comprising a rotary disc driven in timed relation with respect to the belt and has means for ejecting the inspected articles into a container or the like, wherein said disc is easily detached from the apparatus for thorough cleaning and the single belt is also easily accessible for thorough cleaning also with the disc removed.

---

This invention relates to an inspection table particularly adapted for articles such as tablets which must have both sides thereof inspected, and it comprises an endless belt receiving the articles in a single layer relationship so that they pass the inspector, means for inverting the tablets and depositing them onto a rotating disc for the inspection of the opposite sides thereof, said disc being provided with generally fixed ejection means so that the inspected articles can be deposited into a container, and including means for quickly and easily attaching and detaching the disc relative to the remainder of the apparatus so that it is easily and quickly accessible for cleaning and so that it is out of the way for easier access to the belt for cleaning the latter.

In the pharmaceutical arts, it is necessary to thoroughly clean apparatus of this description when changing from the inspection of one kind of pharmaceutical product to another, since if any dust or the like remains of one batch of a pharmaceutical product which may become attached in some way to pharmaceutical products of a different nature, the latter become adulterated. In the prior art, inspection tables for the kind of inspection contemplated herein, ordinarily require the use of a pair of endless belts and it has always been very difficult to make the same accessible for thorough cleaning between changes. Other objects and advantages of the invention will appear hereinafter.

Reference is to be had to the accompanying drawings in which:

FIG. 1 is a view in side elevation, and
FIG. 2 is a plan view.

Referring now to the principal parts of the inspection table, there is provided a hopper for instance indicated at 10 mounted on a cabinet or the like 12 which may contain control apparatus, etc. The tablets issue through a special conveyor generally indicated at 14 and which forms no part of the present invention onto a belt 16 driven to pass in the direction of the arrow in FIG. 1 under a brush 18 which insures that the tablets or other articles to be inspected shall proceed along belt 16 in a single layer. The operator stands approximately in the positon indicated at 20 and easily inspects the uppermost sides of said articles and can abstract damaged articles. The belt, driving mechanism therefor, and brush are all mounted on a suitable framework.

At the end of the belt 16 there is an article turnover device 22 which is old and well known and comprises in general a curved shield holding the tablets or other articles in their plane so that they go around with the belt 16 and are turned over, providing the layer of articles with their previously down sides now uppermost on a rotating disc generally indicated at 24. This disc rotates in the direction of the arrow applied thereto and another operator standing in approximately the position shown at 26 thereby easily inspects the now exposed sides of the articles.

As the disc rotates as indicated, the layer of articles gradually impinges upon the curved edge 28 of a fixed barrier 30 overlying the disc and are thus gradually moved to exit or be ejected at the edge portion of the disc indicated at 32, to any kind of collector which may be provided.

The disc 24 may be driven from the same mechanism that drives the belt 16 through a relatively simple driving connection 34 to drive a shaft 36 in turn driving an upright spindle or the like 38.

The spindle 38 may be conveniently mounted in a bearing in a block 40 mounted between a pair of legs 42 and 44 which legs may be detachably mounted as for instance on bracket members 46, 46 in turn mounted on the framework for the belt 16 and its driving apparatus, and including an adjustable leg at 48, there being a similar leg 50 aiding in supporting the apparatus with relation to the cabinet 12.

The fixed legs 42 and 44 diverge as at 52, 54 terminating in supporting brackets generally indicated at 56, 56 outboard of the periphery of the disc 24. These supports may accept any kind of fastener such as thumbscrews or the like engaging in slots 58 in brackets 60 substantially permanently mounted with respect to a fixed rim-like barrier member 62 partially surrounding the disc 24 at the periphery thereof. The disc 24 is located in a plane below the upper surface of the barrier 62 the same being preferably lined with a plastic or similar member against which the tablets may impinge in their travel in the direction of the curved arrow in FIG. 1 applied to disc 24. There may also be a supporting pedestal at 64 directly supporting the bracket members 40 and thus also supporting legs 42 and 44.

The disc 24 may also have strut-like radial supports 66 to keep it rigid, these supports extending out from the center socket at 68 which receives the spindle 38. The barrier 62 may have a fastening bracket 70 secured to the vertical front wall 72 which protects the belt 16 from the operator's side of the machine. The side wall 72 may support the barrier 30 as by attachment bracket as shown at 74.

In some cases, empty capsules may be desired to be inspected, in which case a light is positioned below the top run of the belt and an inclined grooved plate as at 76 may be attached in any way desired with respect to the side wall 70, etc., so that the empty capsules will rotate as they pass along the same and can be easily inspected by reason of the light. The light is indicated at 78, and the belt is changed to a transparent belt.

One of the advantages of the present construction resides in the provision of a disc-type of inspection table as at 24, 62 which is in the form of an attachment and is easily removed. In other words, the belt 16 and the appurtenant parts, hopper, etc. may be utilized as an inspection table, and if desired the turnover attachment and disc can be mounted thereon or taken off at any time desired. However the main purpose of the invention is carried out by having the parts very easily demountable by detaching the fasteners from brackets 60 for instance and lifting the disc from its support so that it and the underlying parts may be easily and thoroughly cleaned in cases where a different pharmaceutical product is to be inspected. With the member 62 and the disc removed, it is then an easy matter to remove the side wall 72 to have easy access to the belt 16 and appurtenant parts so that they may also be cleaned of all dust and other matter which may have lodged therein during the previous run.

In the prior art where belts are used to carry articles for inspection on both sides, it has been found to be very difficult to provide access to all parts of these belts and to mechanism for driving the same for a thorough cleaning thereof between runs of different materials to be inspected and the present case obviates this difficulty by the construction described.

Having thus described our invention and the advantages thereof, we do not wish to be limited to the details herein disclosed, otherwise than as set forth in the claims, but what we claim is:

1. An inspection apparatus comprising a framework, a relatively wide flat endless belt mounted thereon and means to drive the belt, a source of supply for articles to be inspected to said belt substantially in a single layer and in a plurality of lines across the belt for inspection of the visible surfaces of the articles, and means completely inverting the articles at the end of the belt opposite the source of supply thereof, for inspection of the opposite surfaces of the articles, a rotary disc underlying said turn-over means and receiving said layer of articles in inverted position, means to drive said disc in timed relation with respect to said belt, a fixed barrier extending generally radially with respect to said disc for impingement thereon by the articles inspected, whereby the latter exit from the disc in position to be collected at the periphery of the disc, and a spindle on the disc and detachably mounted with respect to said framework for supporting said disc in operative position with respect to said turn-over means for quick detachment of the disc relative to the framework.

2. The inspection apparatus of claim 1 wherein the means for supporting the disc includes a curvilinear barrier adjacent a portion of the periphery of the disc, said barrier rising above the surface of the disc in spaced relation to the first barrier, said second-named barrier having a terminal point adjacent to but spaced from said first-named barrier.

3. The inspection apparatus of claim 1 wherein the means for supporting the disc includes a curvilinear barrier adjacent a portion of the periphery of the disc, said barrier rising above the surface of the disc in spaced relation to the first barrier, said second-named barrier having a terminal point adjacent to but spaced from said first-named barrier, and detachable means for the barriers, the disc being detachable from its spindle.

4. The inspection apparatus of claim 1 including a sideboard for the belt and means detachably supporting the sideboard on the framework.

References Cited

UNITED STATES PATENTS

| 826,641 | 7/1906 | Wright | 239—672 |
|---|---|---|---|
| 1,096,011 | 5/1914 | Beckwith | 239—672 |
| 1,949,847 | 3/1934 | Stockdale | 198—204 |

FOREIGN PATENTS 920,763      Great Britain.

RICHARD E. AEGERTER, *Primary Examiner.*